US007535918B2

(12) United States Patent
Vasudevan et al.

(10) Patent No.: US 7,535,918 B2
(45) Date of Patent: May 19, 2009

(54) COPY ON ACCESS MECHANISMS FOR LOW LATENCY DATA MOVEMENT

(75) Inventors: Anil Vasudevan, Portland, OR (US); D. Michael Bell, Beaverton, OR (US); Sujoy Sen, Portland, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 11/171,602

(22) Filed: Jun. 30, 2005

(65) Prior Publication Data

US 2007/0002881 A1    Jan. 4, 2007

(51) Int. Cl.
*H04L 12/56* (2006.01)
*H04J 1/16* (2006.01)
(52) U.S. Cl. .......................... 370/419; 370/412; 710/5
(58) Field of Classification Search ......... 370/412–419, 370/428, 429; 711/119, 165; 710/5
See application file for complete search history.

(56) References Cited

U.S. PATENT DOCUMENTS

2004/0049649 A1* 3/2004 Durrant ...................... 711/165
2006/0095673 A1* 5/2006 Van Doren et al. .......... 711/119

OTHER PUBLICATIONS

Iyer, Ravishankar , "A Low Overhead Mechanism for Offloading Copy Operations", U.S. Appl. No. 11/026,321, filed Dec. 29, 2004, 21 pgs.
Sen, Sujoy , "Using a Thershold Value to Control Mid-Interrupt Polling", U.S. Appl. No. 10/973,790, filed Oct. 25, 2004, 43 pgs.
Vasudevan, Anil , "Accelerated TCP (Transport Control Protocol) Stack Processing", U.S. Appl. No. 10/815,895, filed Mar. 31, 2004, 33 pgs.

* cited by examiner

*Primary Examiner*—John Pezzlo
(74) *Attorney, Agent, or Firm*—Caven & Aghevli LLC

(57) ABSTRACT

In one embodiment, a data movement module (DMM) may receive a command to copy data from a source buffer to a destination buffer. One or more cache lines corresponding to addresses of the source buffer and the destination buffer may be invalidated. Also, an entry may be added to a queue to indicate that the command to copy is completion pending.

20 Claims, 6 Drawing Sheets

US 7,535,918 B2

COPY ON ACCESS MECHANISMS FOR LOW LATENCY DATA MOVEMENT

BACKGROUND

Networking has become an integral part of computer systems. Advances in network bandwidths, however, have not been fully utilized due to overhead that may be associated with processing protocol stacks. A protocol stack generally refers to a set of procedures or programs that may be executed to handle packets sent over a network, where the packets may conform to a specified protocol. For example, TCP/IP (Transport Control Protocol/Internet Protocol) packets may be processed using a TCP/IP stack.

Overhead associated with processing protocol stacks may result from bottlenecks in a computer system from using a central processing unit (CPU) to perform slow memory access functions such as data movement. Such overhead may be reduced by partitioning protocol stack processing. For example, TCP/IP stack processing may be offloaded to a TCP/IP offload engine (TOE). Also, the entire TCP/IP stack may be offloaded to a networking component, such as a MAC (media access control) component, of an I/O subsystem, such as a NIC (network interface card). However, valuable CPU cycles may still be spent waiting for the offloaded processing to complete.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
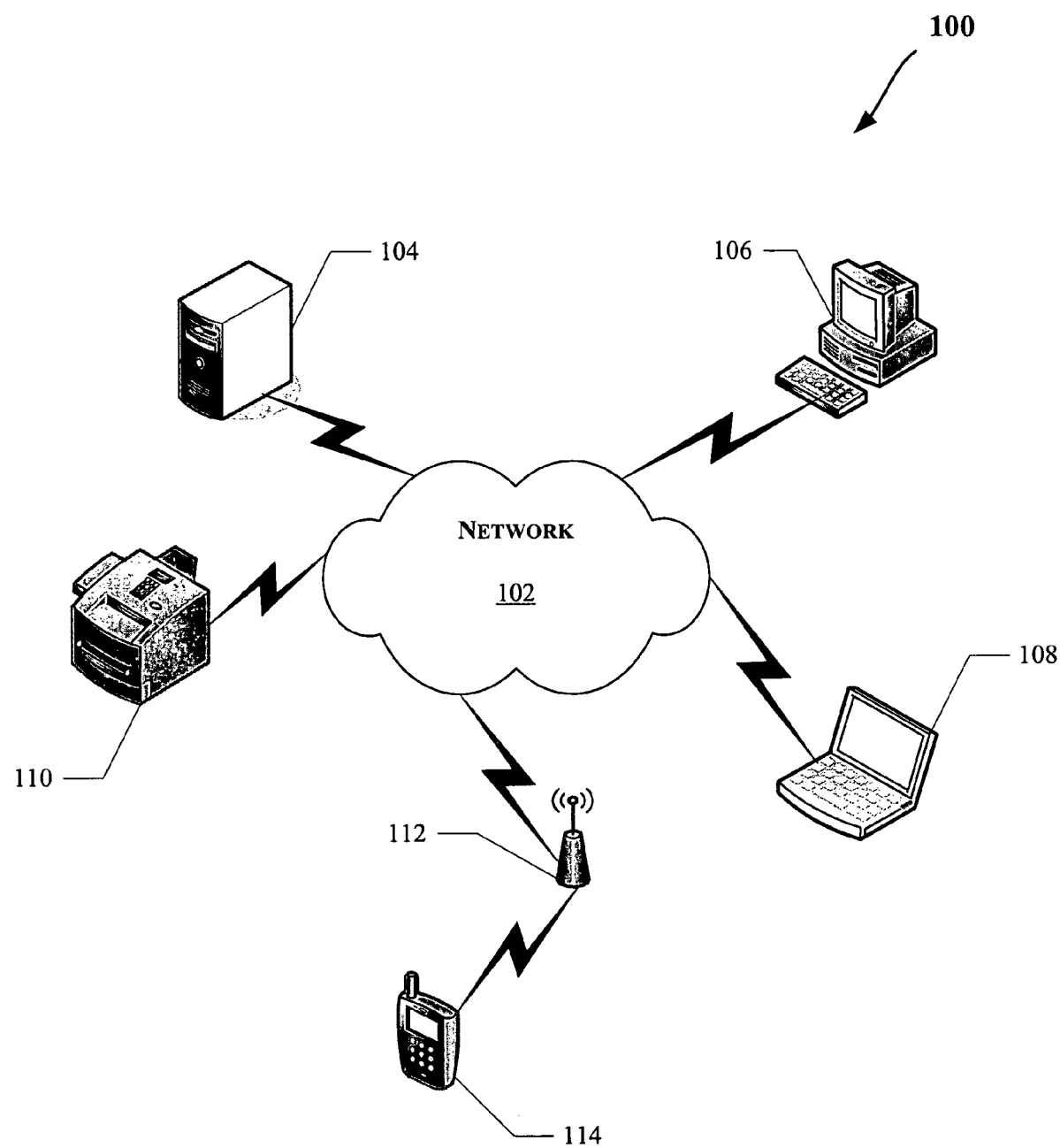
FIG. 1 illustrates various components of an embodiment of a networking environment, which may be utilized to implement various embodiments discussed herein.

FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, or the like), a wireless access point 112, a personal digital assistant or smart phone 114, a rack-mounted computing system (not shown), or the like. The network 102 may be any suitable type of a computer network including an intranet, the Internet, and/or combinations thereof.

The devices 104-114 may be coupled to the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access.

The network 102 may utilize any suitable communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), or the like), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), or the like. Moreover, network communication may be established by internal network interface devices (e.g., present within the same physical enclosure as a computing system) or external network interface devices (e.g., having a separate physical enclosure and/or power supply than the computing system to which it is coupled) such as a network interface card (NIC).

Figure 2:
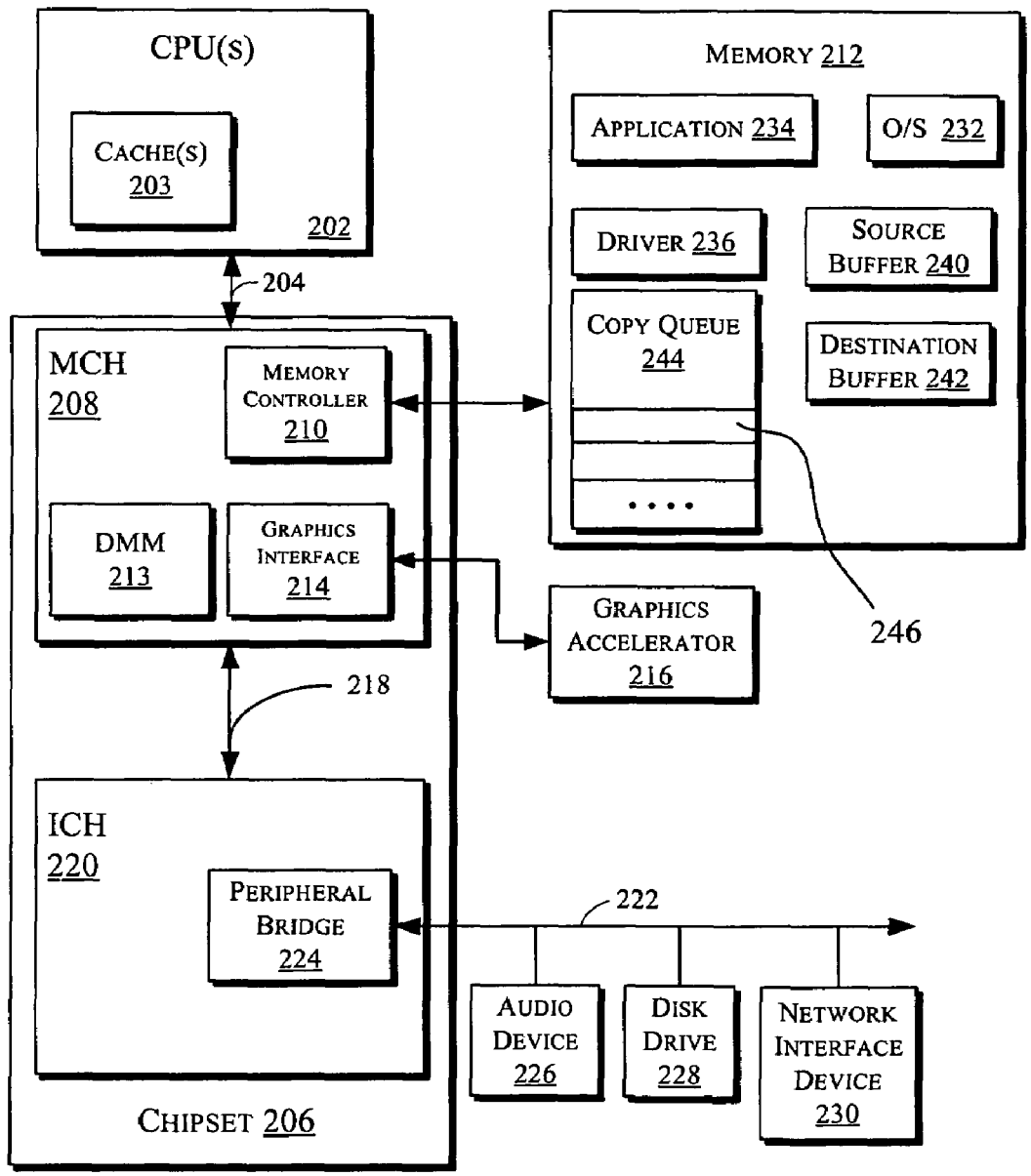
FIGS. 2 and 5 illustrate block diagrams of embodiments of computing systems, which may be utilized to implement various embodiments discussed herein.

FIG. 2 illustrates a block diagram of an embodiment of a computing system 200. One or more of the devices 104-114 discussed with reference to FIG. 1 may comprise the computing system 200. The computing system 200 may include one or more central processing unit(s) (CPUs) 202 or processors coupled to an interconnection network (or bus) 204. The processors (202) may be any suitable processor such as a general purpose processor, a network processor, or the like (including a reduced instruction set computer (RISC) processor or a complex instruction set computer (CISC)). Moreover, the processors (202) may have a single or multiple core design. The processors (202) with a multiple core design may integrate different types of processor cores on the same integrated circuit (IC) die. Also, the processors (202) with a multiple core design may be implemented as symmetrical or asymmetrical multiprocessors.

The processor 202 may include one or more caches (203) which may be shared in one embodiment of the invention. Generally, a cache stores data corresponding to original data stored elsewhere or computed earlier. To reduce memory access latency, once data is stored in a cache, future use may be made by accessing a cached copy rather than refetching or recomputing the original data. The cache 203 may be any suitable cache, such a level 1 (L1) cache, a level 2 (L2) cache, a level 3 (L-3), or the like to store instructions and/or data that are utilized by one or more components of the system 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data and sequences of instructions that are executed by the processor 202, or any other device included in the computing system 200. In one embodiment of the invention, the memory 212 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 204, such as multiple processors and/or multiple system memories.

The MCH 208 may also include a graphics interface 214 coupled to a graphics accelerator 216. In one embodiment, the graphics interface 214 may be coupled to the graphics accelerator 216 via an accelerated graphics port (AGP). In an embodiment of the invention, a display (such as a flat panel display) may be coupled to the graphics interface 214 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

The MCH 208 may further include a data movement module (DMM) 213, such as a DMA (direct memory access) engine. As will be further discussed herein, e.g., with reference to FIGS. 3, 4A, and 4B, the DMM 213 may provide data movement (e.g., data copying) support to improve the performance of a computing system (200). In some instances, there may be a significant time gap between when data is copied from a source to a destination versus when the data is accessed by an application. Hence, the DMM 213 may perform one or more data copying tasks instead of involving the processors 202. More particularly, as will be further discussed with reference to FIG. 3, the DMM 213 may allow a copy command to retire prior to the completion of the copy command. In an embodiment, the early retirement of the copy command allows a processor (202) to perform other tasks while the DMM 213 performs the copying to improve the performance of the system 200. Furthermore, since the memory 212 may store the data being copied by the DMM 213, the DMM 213 may be located in a location near the memory 212, for example, within the MCH 208, the memory controller 210, the chipset 206, or the like. However, the DMM 213 may be located elsewhere in the system 200 such as within the processor(s) 202.

Referring to FIG. 2, a hub interface 218 may couple the MCH 208 to an input/output control hub (ICH) 220. The ICH 220 may provide an interface to input/output (I/O) devices coupled to the computing system 200. The ICH 220 may be coupled to a bus 222 through a peripheral bridge (or controller) 224, such as a peripheral component interconnect (PCI) bridge, a universal serial bus (USB) controller, or the like. The bridge 224 may provide a data path between the processor 202 and peripheral devices. Other types of topologies may be utilized. Also, multiple buses may be coupled to the ICH 220, e.g., through multiple bridges or controllers. Moreover, other peripherals coupled to the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 222 may be coupled to an audio device 226, one or more disk drive(s) 228, and a network interface device 230. Other devices may be coupled to the bus 222. Also, various components (such as the network interface device 230) may be coupled to the MCH 208 in some embodiments of the invention. In addition, the processor 202 and the MCH 208 may be combined to form a single chip. Furthermore, the graphics accelerator 216 may be included within the MCH 208 in other embodiments of the invention.

Additionally, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media suitable for storing electronic instructions and/or data.

The memory 212 may include one or more of the following in an embodiment: an operating system (O/S) 232, application 234, driver 236, source buffer 240, destination buffer 242, and copy queue 244. The O/S 232 may include one or more protocol stacks (not shown). A protocol stack generally refers to a set of procedures or programs that may be executed to handle packets sent over a network, where the packets may conform to a specified protocol. For example, TCP/IP (Transport Control Protocol/Internet Protocol) packets may be processed using a TCP/IP stack. The application 234 may utilize the O/S 232 to communicate with various components of the system 200, e.g., through the driver 236. In one embodiment, the processor 202 or a media access control (MAC) component, of an I/O subsystem (e.g., the network interface device 230) may utilize the protocol stack of the O/S 232 and/or the driver 236 to process the packets received from a computer network coupled to the system 200 (such as the computer network 102 of FIG. 1). In an embodiment, a "packet" may be a sequence of one or more symbols and/or values that may be encoded by one or more electrical signals transmitted from at least one sender to at least on receiver (e.g., over a network such as the network 102 of FIG. 1).

In one embodiment, the source buffer 240 may store data received by the system 200 from a computer network (e.g., the network 102 of FIG. 1). The data stored in the source buffer 240 may be copied to the destination buffer 242 as will be further discussed with reference to FIG. 3. The copy queue 244 may store various data that are organized as one or more entries 246. In an embodiment, each entry 246 of the copy queue 244 may include the address of the source buffer 240, the address of the destination buffer 242, and an indicia (e.g., such as a bit) to indicate the status of data movement between the source and destination buffers (240-242).

Figure 3:
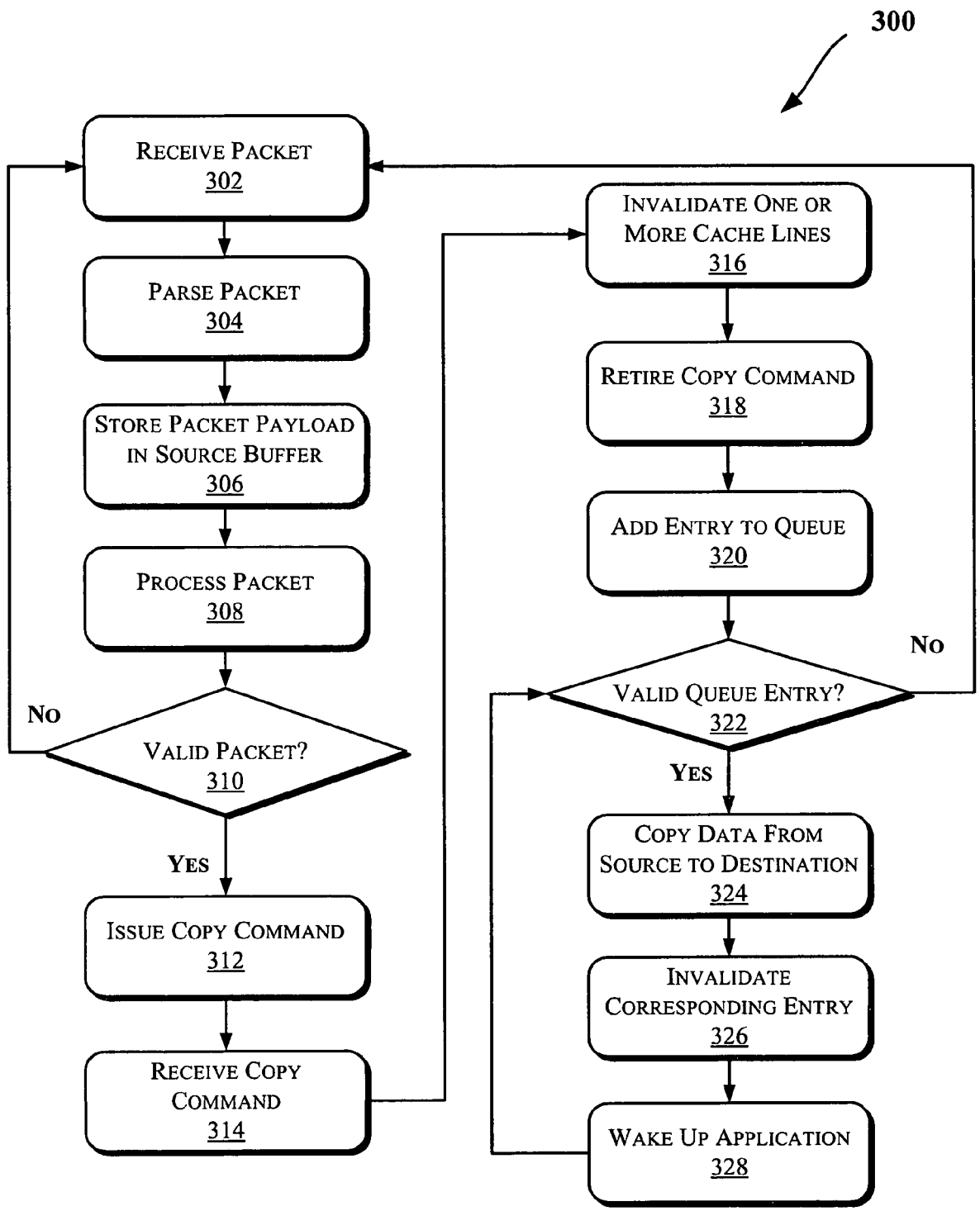
FIG. 3 illustrates a block diagram of an embodiment of a method to delay completion of a copy command.

FIG. 3 illustrates a block diagram of an embodiment of a method 300 to delay completion of a copy command until access (also referred to herein as copy on access (COA)). In an embodiment, various components of the system 200 of FIG. 2 may be utilized to perform one or more of the operations discussed with reference to FIG. 3.

Referring to FIGS. 2 and 3, the computing system 200 may receive a packet (302) from a computer network, e.g., by the network interface device 230 from a network such as the network 102 of FIG. 1. The packet may be parsed (304), e.g., by splitting the packet header and payload. The payload of the packet may be stored in a source buffer (240). The received packet (302) may be processed (308 to determine whether the packet includes valid data (310). If the packet is invalid (e.g., includes invalid data), the method 300 resumes at the stage 302 to receive the next packet. Otherwise, if the packet is valid (310), a copy command may be issued (312). In one embodiment, the processor 202 or a media access control (MAC) component, of an I/O subsystem (e.g., the network interface device 230) may perform the stages 302 through 312. If the processor 202 performs one or more of these stages (302-312), data may be stored in the cache 203, e.g., to facilitate data access by the processor 202.

The DMM 213 may receive the copy command (314) and cause invalidation of one or more cache lines (316) from the cache 203. In one embodiment, the processor 202 and/or the DMM 213 may snoop the cache 203 to perform the stage 316. In some embodiments, such as those complying with the front side bus (FSB) architecture (available from Intel® Corporation of Santa Clara, Calif., assignee of the present application), the DMM 213 may issue a read for ownership (RFO) request to ensure that data corresponding to the source and/or destination buffers (240-242) are absent from the cache 203. Hence, the DMM 213 may take ownership of the source and destination addresses. Also, a single request may invalidate multiple cache lines from the cache 203 in an embodiment.

At a stage 318, the DMM 213 may retire the copy command (318). For example, the DMM 213 may add an entry to a queue (such as the copy queue 244 of FIG. 2) to indicate that the command to copy is completion pending. As discussed with reference to FIG. 2, each entry 246 of the copy queue 244 may include the address of the source buffer 240, the address of the destination buffer 242, and/or an indicia (e.g., such as a bit) to indicate the status of data movement between the source and destination buffers (240-242). The DMM 213 may also determine whether the queue (244) includes any valid entries to process (322). If no valid entries remain (322), the method 300 resumes at the stage 302 to receive the next packet. Otherwise, if there are valid queue entries (322), the DMM 213 may copy the data from the source buffer (240) to the destination buffer (242) at a stage 324.

Once the data is copied, the corresponding entry in the queue (246) may be invalidated (326). For example the indicia corresponding to the status of the data movement may be modified. In one embodiment, the corresponding entry may be removed from the queue (240). Hence, at the stage 322, a valid entry would be any entry present in the queue. Upon completion of the copying, the DMM 213 may wake up a corresponding application, e.g., by informing the O/S 232 that data is ready for the application. The application may be any suitable application that is capable of executing on the computing device 200 such as the application 236 stored in the memory 212.

Figure 4A:
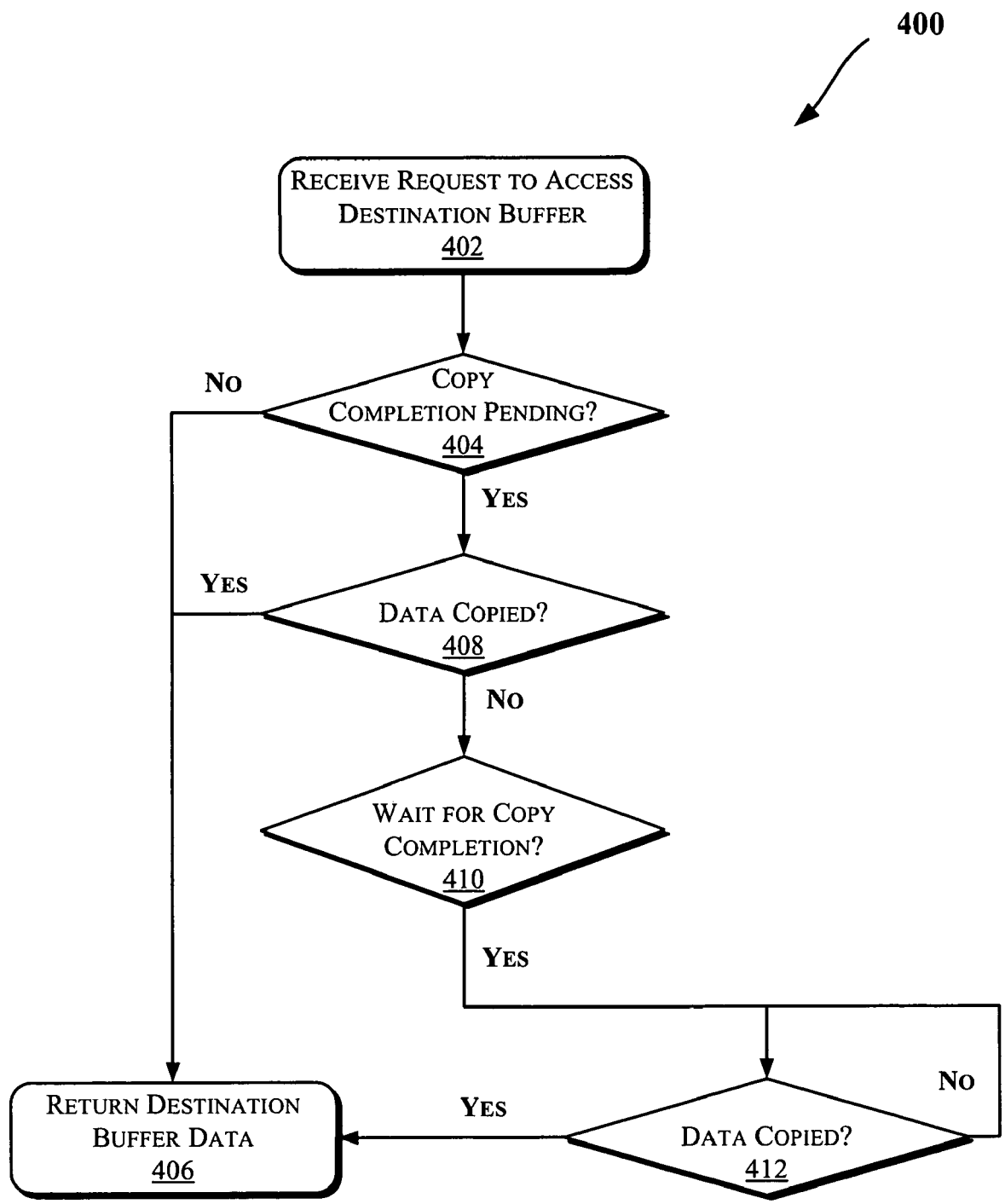
FIG. 4A illustrates a block diagram of an embodiment of a method to respond to a request to access a destination buffer.

FIG. 4A illustrates a block diagram of an embodiment of a method 400 to respond to a request to access a destination buffer. In an embodiment, various components of the system 200 of FIG. 2 may be utilized to perform one or more of the operations discussed with reference to FIG. 4A. Referring to FIGS. 2 and 4A, at a stage 402, the DMM 213 receives a request to access a destination buffer (such as the destination buffer 242). The DMM 213 may receive the request by monitoring memory transactions on the interconnection network 204 and/or hub interface 218. The DMM 213 may determine if the received request (402) corresponds to a copy command that is completion pending (404).

In an embodiment, the DMM 213 may perform the stage 404 by accessing the queue (244) to determine whether any corresponding valid entry is present in the queue (244). If no valid entry is present in the queue (244) (or the corresponding entry is invalidated), the DMM 213 may return data from the destination buffer (242) at a stage 406. Otherwise, if the corresponding copy command is pending completion (404) (e.g., there is a corresponding valid entry 246 present in the copy queue 244), the DMM 213 may determine whether the data (such as the packet data discussed with reference to FIG. 3) has been copied (408). In an embodiment, since one or more cache lines corresponding to the destination buffer (242) have been invalidated (e.g., as discussed with reference to the stage 316 of FIG. 3), stores or writes to the destination buffer (242) may be performed by streaming stores, e.g., to reduce bandwidth utilization on the interconnection network 204.

If the stage 408 determines that the data has been copied, the DMM 213 may return data from the destination buffer (406). If the data has not been copied (408), the DMM 213 may determine whether to wait for the completion of copying (410). If the stage 410 determines that the DMM 213 is to wait (410), the DMM 213 may determine whether data is copied (412). After the data is copied (412), the destination buffer (242) data may be returned (406). In one embodiment, to perform the stage 410, the DMM 213 may access configuration data regarding how a copy command is to be handled. For example, indicia may be stored in the entries (246) of the copy queue 244 to indicate whether for a specific entry the DMM 213 should wait for the completion of a copy command. The DMM 213 may access the queue (244) to determine how to handle the stage 410.

Figure 4B:
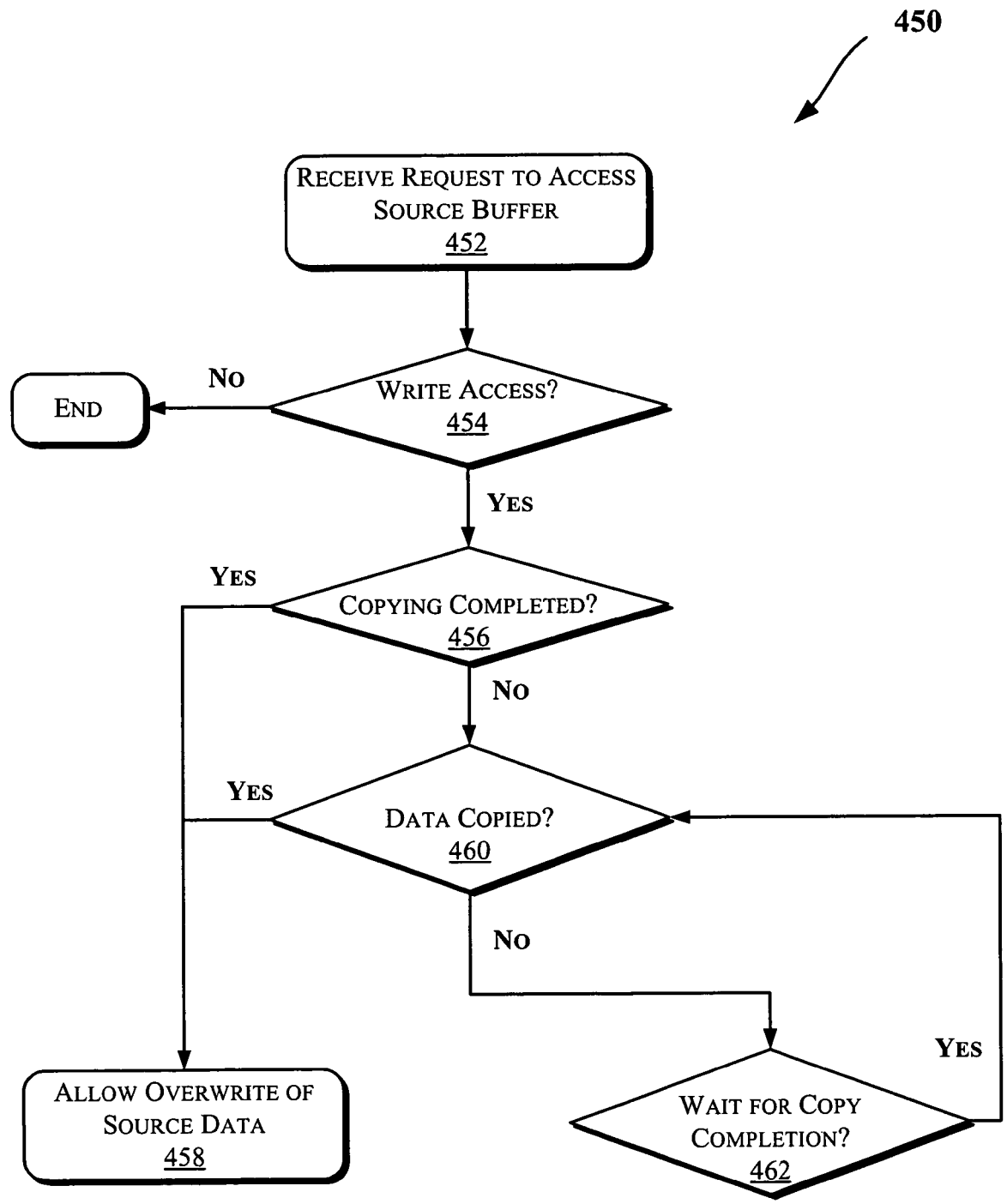
FIG. 4B illustrates a block diagram of an embodiment of a method to respond to a request to access a source buffer.

FIG. 4B illustrates a block diagram of an embodiment of a method 450 to respond to a request to access a source buffer. In an embodiment, various components of the system 200 of FIG. 2 may be utilized to perform one or more of the operations discussed with reference to FIG. 4B. Referring to FIGS. 2 and 4B, at a stage 452, the DMM 213 receives a request to access a source buffer (such as the source buffer 240). The DMM 213 may receive the request by monitoring memory transactions on the interconnection network 204 and/or hub interface 218. The DMM 213 may determine if the received request (452) corresponds to a read access (454). If the access is not a write access (e.g., is a read access) (454), the method 450 may terminate (e.g., by allowing read access to the source buffer 240). Otherwise, if the access is a write access (454), the DMM 213 may determine whether the data (such as the packet data discussed with reference to FIG. 3) has been copied (456). For example, as discussed with the stage 404 of FIG. 4A, the stage 456 may determine whether there is a corresponding valid entry 246 present in the copy queue 244.

If the stage 456 determines that the data has been copied, the DMM 213 may allow overwriting of the source buffer (458). If the data has not been copied (456), the DMM 213 may determine whether data has been copied from the source buffer 240 to the destination buffer 242 (460). A stage 462 (e.g., via the DMM 213) may determine whether to wait for copy completion such as discussed with reference to the stage 456. If the stage 462 determines that it should wait for copy completion, the method 450 resumes at the stage 460. Hence, the method 450 may receive a request to write to the source buffer (452) and allow overwrite of the source buffer (240) once the data is copied from the source buffer 240 to the destination buffer 242 (458).

Figure 5:
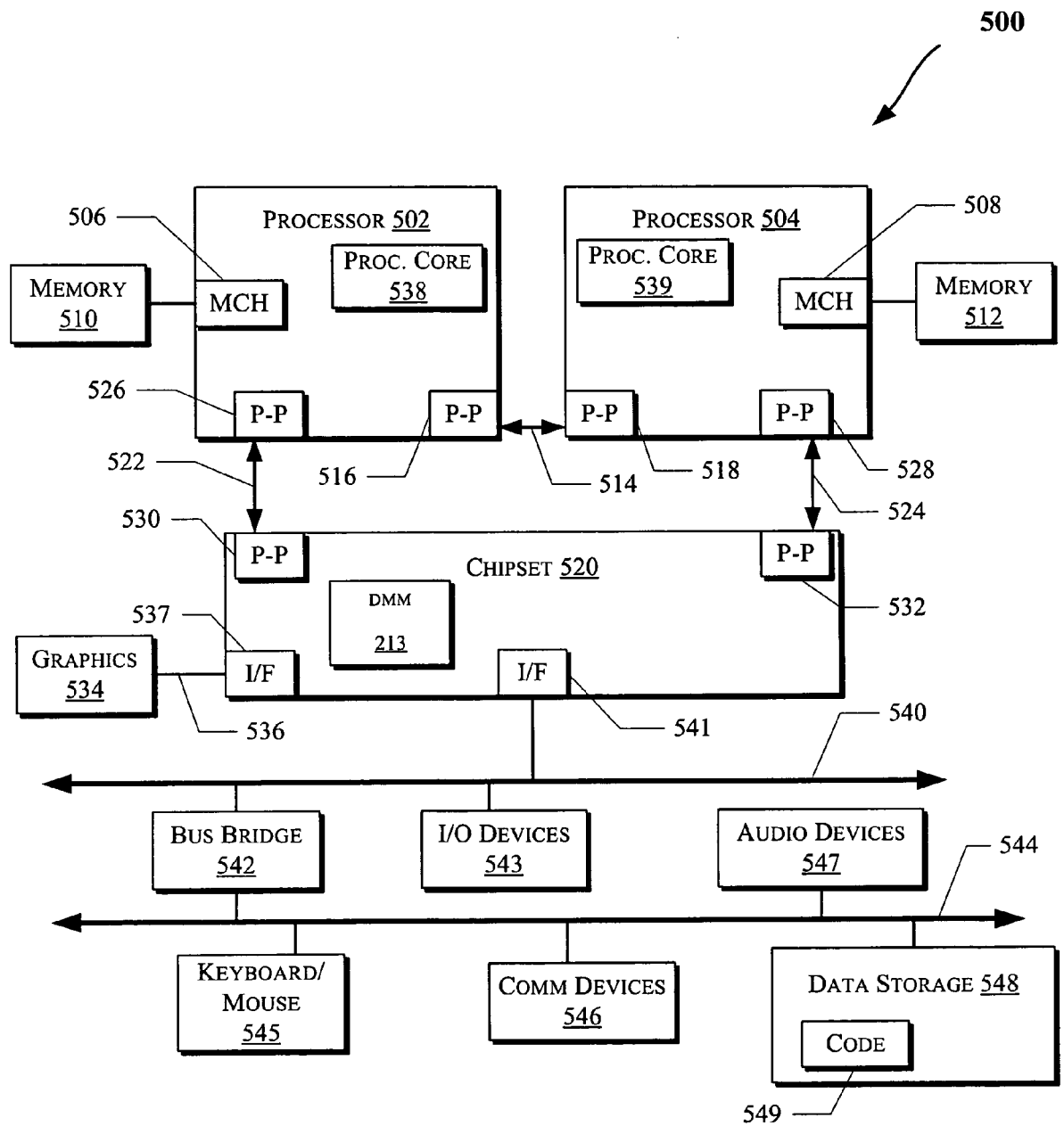

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The computing system 500 may be utilized to implement one or more of the devices 104-114 discussed with reference to FIG. 1. Also, the operations discussed with reference to FIGS. 3, 4A, and 4B may be performed by one or more components of the system 500.

The system 500 of FIG. 5 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 212 of FIG. 2. For example, each of the memories 510 and/or 512 may include the O/S 232, the application 234, the driver 236, the source buffer 240, the destination buffer 242, and/or the copy queue 244.

The processors 502 and 504 may be any suitable processor such as those discussed with reference to the processors 202 of FIG. 2. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be located within the processors 502 and 504. For example, the DMM 213 may be located within the processors 502 and 504. Other embodiments of the invention, however, may exist in other circuits, logic units, or devices within the system 500 of FIG. 5. For example, as illustrated in FIG. 5, the DMM 213 may be located within the chipset 520. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 543 may be coupled to other devices such as a keyboard/mouse 545, communication devices 546 (such as modems, network interface devices, or the like), audio I/O device, and/or a data storage device 548. The data storage device 548 may store code 549 that may be executed by the processors 502 and/or 504. For example, the data packet discussed with reference to FIG. 3 may be received by the system 500 from the communication devices 546, I/O devices 543, or other devices coupled to the chipset 520.

In various embodiments, one or more of the operations discussed herein, e.g., with reference to FIGS. 1-5, may be implemented as hardware (e.g., logic circuitry), software, firmware, or combinations thereof, which may be provided as a computer program product, e.g., including a machine-readable or computer-readable medium having stored thereon instructions used to program a computer to perform a process discussed herein. The machine-readable medium may include any suitable storage device such as those discussed with reference to FIGS. 2 and 5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with that embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    a data movement module (DMM) to:
        receive a command to copy data from a source buffer to a destination buffer;
        add an entry to a queue to indicate that the command to copy is completion pending; and
        retire the command to copy the data prior to a completion of copying the data from the source buffer to the destination buffer; and
    a processor to invalidate one or more cache lines corresponding to one or more addresses of the source buffer or the destination buffer.

2. The apparatus of claim 1, wherein the DMM retires the command to copy after the processor invalidates the one or more cache lines.

3. The apparatus of claim 1, wherein the queue entry comprises one or more of the source buffer address, the destination buffer address, or an indicia to indicate whether the command to copy is completion pending.

4. The apparatus of claim 1, wherein the processor issues the command to copy the data from the source buffer to the destination buffer.

5. The apparatus of claim 1, further comprising a memory coupled to the processor, wherein the memory comprises the source and destination buffers.

6. The apparatus of claim 1, further comprising a cache coupled to the processor, wherein the processor invalidates one or more cache lines of the cache.

7. The apparatus of claim 1, further comprising a memory controller that comprises the DMM.

8. The apparatus of claim 1, wherein the processor comprises the DMM.

9. The apparatus of claim 1, further comprising a network interface device to receive the data stored in the source buffer.

10. A method comprising:
    receiving a command to copy data from a source buffer to a destination buffer;
    retiring the command to copy the data prior to a completion of copying the data from the source buffer to the destination buffer;
    adding an entry to a queue to indicate that the command to copy is completion pending; and
    invalidating one or more cache lines corresponding to one or more addresses of the source buffer or the destination buffer.

11. The method of claim 10, wherein the retiring the command to copy the data is performed after invalidating the one or more cache lines.

12. The method of claim 10, further comprising invalidating the entry in the queue after the data is copied from the source buffer to the destination buffer.

13. The method of claim 10, further comprising:
receiving a request to access the destination buffer; and
returning data from the destination buffer if the entry in the queue is invalidated.

14. The method of claim 10, further comprising:
receiving a request to access the destination buffer;
waiting for the data to be copied from the source buffer to the destination buffer if the entry in the queue indicates that the command to copy is completion pending; and
returning data from the destination buffer once the data is copied from the source buffer to the destination buffer.

15. The method of claim 10, further comprising:
receiving a request to write to the source buffer; and
allowing overwrite of the source buffer once the data is copied from the source buffer to the destination buffer.

16. The method of claim 10, further comprising:
receiving a request to write to the source buffer;
waiting for the data to be copied from the source buffer to the destination buffer if the entry in the queue indicates that the command to copy is completion pending; and
allowing overwrite of the source buffer once the data is copied from the source buffer to the destination buffer.

17. The method of claim 10, further comprising waking up a corresponding application after the data is copied from the source buffer to the destination buffer.

18. A system comprising:
a memory to store a source buffer and a destination buffer; and
a data movement module (DMM) to:
receive a command to copy data from the source buffer to the destination buffer;
retire the command to copy the data prior to a completion of copying the data from the source buffer to the destination buffer;
add an entry to a queue to indicate that the command to copy is completion pending; and
a processor to invalidate one or more cache lines corresponding to one or more addresses of the source buffer or the destination buffer.

19. The system of claim 18, wherein the memory is a volatile memory.

20. The system of claim 19, wherein the volatile memory is one or more of a RAM, DRAM, SDRAM, or SRAM.

* * * * *